Dec. 12, 1967   W. R. FINKENSTEIN ETAL   3,357,727
JOINT ASSEMBLY FOR FRAMEWORK STRUCTURES
Filed Nov. 19, 1965
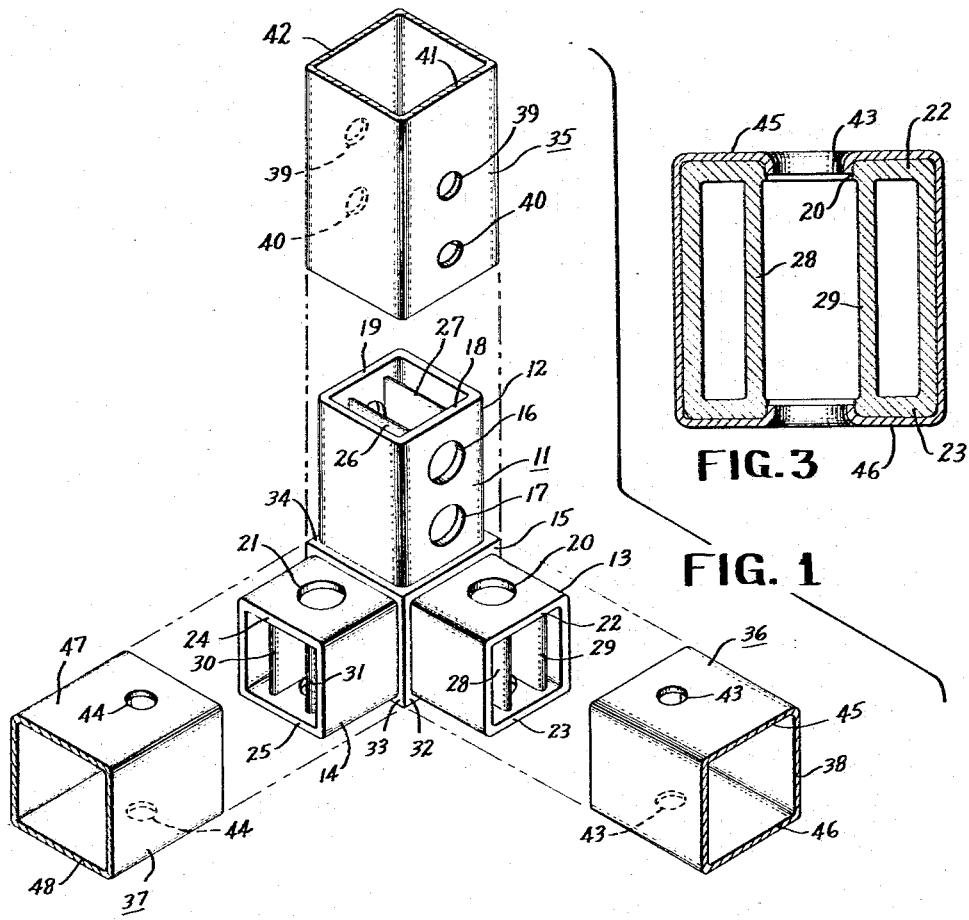
FIG. 1
FIG. 3
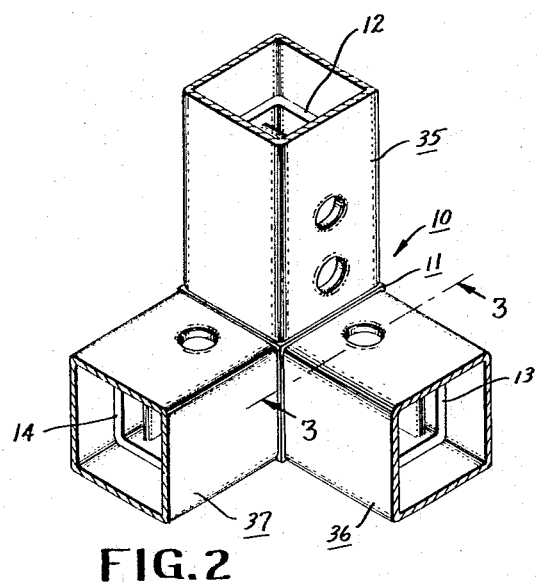
FIG. 2
INVENTORS.
WILLIAM R. FINKENSTEIN,
WILLIAM F. OLASHAW
BY Robert H. Casey
ATTORNEY

United States Patent Office 3,357,727
Patented Dec. 12, 1967

3,357,727
JOINT ASSEMBLY FOR FRAMEWORK STRUCTURES
William R. Finkenstein, Bristol, and William F. Olashaw, New Britain, Conn., assignors to General Electric Company, a corporation of New York
Filed Nov. 19, 1965, Ser. No. 508,763
6 Claims. (Cl. 287—54)

ABSTRACT OF THE DISCLOSURE

A joint assembly for framework structures comprising a connecting member having a body portion from which extends a plurality of tubular stub portions, each of which has side portions with apertures therein; a plurality of elongated tubular framework members, each also provided with apertures, have their end portions fitted over the stub portions respectively in telescoping relation and are secured to the tubular stub portions by "drawing" the rim portions of the framework member apertures into the apertures of the stub portions.

BACKGROUND OF THE INVENTION

(1) Field of the invention

Our invention relates to a joint assembly for framework structures, and method of forming the same. More particularly, the invention relates to a corner assembly for connecting two or more elongated framework members.

(2) Description of the prior art

The method of assembly employed to connect elongated framework members in the past has generally involved the use of either bolts or welding. Such prior art joint assemblies have suffered from the disadvantage that they require extreme accuracy in construction of the parts and drilling of holes, with corresponding increase in expense of manufacture and time required for the assembly. A further disadvantage of such prior art joint assemblies lies in the fact that they are commonly subject to loosening by vibration, and often comprise a weak point in the structure.

Although welding produces a joint assembly which is more satisfactory than when bolts are used, such welding also has several disadvantages. A primary disadvantage is that it is impossible to stock finish painted framework members ready for assembly, since welding must be done before the members are painted. Another disadvantage of welding is the requirement for jigs or fixtures in order to hold the parts in proper alignment during welding operation. Finally, certain relatively expensive and time consuming finishing or cleaning operations are required following welding.

OBJECTS OF THE INVENTION

An object of the present invention is to provide a joint assembly wherein framework members are secured to a connecting member without the use of bolts or welding.

Another object of the invention is to provide a joint assembly having a higher structural strength than prior art types, and yet being of lower weight than such types.

A further object of the invention is to provide a joint assembly comprising non-ferromagnetic connecting means, whereby a frame structure may be constructed, using elongated ferro-magnetic framework members without creating closed loop magnetic paths.

A still further object of the invention is to provide a joint assembly which includes framework members that may easily be modified in order to construct framework structures of various sizes.

Yet another object of the invention is to provide a method of forming the joint assembly whereby the joint assembly can be very rapidly constructed, at a lower cost than present types, and without the need for highly specialized tools or skills on the part of the assembler.

SUMMARY OF THE INVENTION

In accordance with the invention, a joint assembly for framework structures is provided comprising a connecting member having a hub or body portion from which extends a plurality of tubular stub portions. Each of these stub portions has at least one generally planar side portion in which there is at least one aperture. The joint assembly also includes a plurality of elongated tubular framework members each having at least one planar side portion, also with at least one aperture therein. Each of the framework members is assembled in partially telescoping relation with one of the tubular stub portions so that the planar side portion of the framework member is adjacent the planar side portion of the tubular stub portion, and so that the aperture in the framework In order to tightly secure the framework members to the stub portions, at least one member of each pair of telescoping members has an integral portion adjacent the aperture therein extending at least partly into the corresponding aligned aperture in the other of the telescoping members, and interlocking the two telescoping members.

In accordance with one aspect of the invention, the connecting member is constructed of non-ferromagnetic material, and includes means maintaining the connected ends of the framework members out of contact with each other, thereby avoiding closed magnetic loop paths.

In accordance with the method aspects of the invention, the interlocking portion adjacent the aperture is formed by swaging or drawing metal from the periphery of the aperture in one of the members into the aperture of the other member to form a flange on one member fitting closely into the aperture in the other member. To facilitate this operation, the invention in one form comprises a connecting member having tubular stub portions with at least one aperture in a side wall thereof and a pair of reinforcing ribs extending from that side wall to the opposite side wall, to brace the sides against the forces exerted thereon during the drawing operation.

The invention will be more fully understood by reference to the following detailed description, taken in conjunction with the accompanying drawings, and its scope will be pointed out in the appended claims.

BRIEF DESCRIPTION OF THE DRAWINGS

Referring to the drawing:
FIGURE 1 is a perspective exploded view of a joint assembly incorporating the invention;
FIGURE 2 is an elevation view of the joint assembly of FIGURE 1 in the assembled condition; and
FIGURE 3 is a section on line 3—3 of FIGURE 2.

DESCRIPTION OF A PREFERRED EMBODIMENT

Referring now to FIGURE 1 of the drawings, 10 designates a joint assembly embodying the invention, and including a tripod-like connecting member 11 of non-ferromagnetic material, having three mutually perpendicular tubular stub portions 12, 13, and 14 extending from a central body or hub 15.

The stub portion 12 has two apertures 16 and 17 in each of a pair of opposed generally planar side portions 18 and 19, and stub portions 13 and 14 each have one aperture, designated 20 and 21, respectively, in each of a pair of opposed generally planar side portions 22, 23, and 24, 25 respectively.

As shown, each of the stub portions 12, 13, and 14 includes two reinforcing ribs 26, 27; 28, 29; and 30, 31, respectively, for a purpose to be described. The stub portions 12, 13, and 14 are designed to receive tubular framework members 35, 36, and 37, respectively, in telescoping relation, as shown in FIGURE 2. To provide high structural strength with small weight and at cost, each of the tubular framework members is formed from relatively light-gauge ferromagnetic material in a square shape. The frame members are preferably formed with round corners, thereby eliminating sharp edges on the framework structure.

At the juncture of the stub portions 12, 13, and 14, with the central body or hub 15 of the member 11, there are provided shoulders 32, 33 and 34, respectively. When placed on the stubs 12, 13, and 14, the framework members abut against the shoulders 32, 33, and 34, respectively. Because the thickness 38 of each framework member 35, 36, and 37 is less than the thickness of each of the shoulders 32, 33, and 34, the framework members, when in abutting relationship with the central body or hub 15 of the member 11, are not in contact with each other. Thus, since the ferromagnetic frame members 35, 36, and 37 are not in physical contact, and since the connecting member is constructed of a non-ferromagnetic material such as zinc, the formation of magnetic loop paths through the framework of the finished housing is avoided. This is particularly desirable when the framework structure is to be used to house electrical equipment.

Framework member 35 has two apertures 39 and 40 in each of a pair of opposed generally planar side portions 41 and 42, and framework members 36 and 37 each have one aperture, designated 43 and 44, respectively, in each of a pair of opposed generally planar side portions 45, 46; and 47, 48 respectively. When the tubular framework member 35 is placed in telescoping relation on the stub portion 12 and against the shoulder 34, the apertures 39 and 40 of the framework member are aligned with the apertures 16 and 17 of the stub portion. Similarly, the apertures 43 and 44, respectively, of framework members 36 and 37, when the latter are placed on the stub portion 13 and 14, are aligned with the apertures 20 and 21 of stub portions 13 and 14, respectively. Because the connecting member 11 has a passage therethrough interconnecting the framework members, a ventilation system is provided for the framework structure.

In order to interlock the framework members to the stub portions of the connecting member 11, the material adjacent the periphery of the apertures 39, 40, 43 and 44, in the framework members is swaged or drawn into the corresponding apertures 16, 17, 20, and 21 in the stub portions of the connecting member as shown in FIGURE 3, thus effecting a permanent connection. For this purpose, the apertures 39, 40, 43, and 44 provided in the framework members 35, 36, and 37, respectively, are preferably of a lesser diameter than the apertures 16, 17, 20 and 21 in the stub portions 12, 13, and 14, respectively.

As shown in FIGURE 3, the ribs 28 and 29 of the stub portion are positioned to reinforce the pair of opposed generally planar side portions such as 22, 23. Thus these ribs help to prevent deformation of the planar side portions by the forces exerted during the drawing operation, whereby the framework member is secured to the stub portion. Also, because of this reinforcing, the apertures referred to may be utilized for such heavy-duty functions such as for lifting, anchoring, connecting sections together, etc.

The method of forming the joint assembly contemplated within the present invention involves the steps of (a) positioning a connecting member having a plurality of apertured stub portions extending therefrom, so that the stub portions are in telescoping relation to a plurality of apertured tubular framework members, such that the apertures in the framework members are aligned with corresponding apertures in the stub portions, and (b) deforming or drawing metal adjacent the periphery of the apertures of the framework members into the apertures of the stub portions, whereby the framework members are fixedly secured to the stub portions. Thus, in accordance with this method, the joint assembly is rapidly constructed without the need for highly specialized tools or skills on the part of the assembler, and without the need of separate fastening members such as nuts and bolts.

An additional feature of the joint assembly of the present invention is the ease with which special length sections may be constructed. To construct a new size of framework structure using the joint assembly of the present invention, all that is necessary is to cut the framework members to the length desired, drill or punch holes in the framework members, insert the stub portions of the connecting member into the framework members, deform the material adjacent the framework member apertures into the stub portion apertures, and new size framework structure is created without the requirement for fabrication of any new parts.

While we have shown one specific embodiment of our invention, it will be readily apparent that many modifications thereof may readily be made by those skilled in the art. Thus, for example, it will be appreciated that more or fewer than three stub portions may be utilized, the number being in accordance with the number of structural members desired to connect.

Further, although it will generally suffice to provide each stub portion with only one aperture in each of a pair of opposed generally planar side portions, such as in the case of stub portions 13 and 14, the particular number of apertures used in each stub portion is dependent primarily upon the structural strength desired for any particular framework structure. Thus, for example, stub portion 12 has been shown as having two such apertures in each side portion.

Also, while the invention has been shown in a particular embodiment wherein the stub portions are inserted into the framework members, it will be appreciated that this arrangement may be reversed, and the respective dimensions may be made such that the framework members are readily insertable into the stub portions. If desired, of course, the framework members could in such case be provided with reinforcing ribs rather than the stub portions.

Moreover, although in the embodiment of the present invention the flanges of the framework member apertures are shown as being deformed into the stub portions apertures, it is well within the scope of the present invention to reverse this relationship and provide the stub portion apertures with flanges that extend into apertures in the framework members.

We, therefore, intend by the appended claims to cover all such modifications as fall within the true spirit and scope of the invention.

What we claim as new and desire to secure by Letters Patent of the United States is:

1. A joint assembly for framework structures comprising:
(a) a connecting member having a plurality of tubular stub portions, each of said stub portions having at least one generally planar side portion;
(b) said planar side portions each having at least one aperture therein;
(c) a plurality of elongated tubular framework members, each of said framework members having at least one generally planar side portion adjacent one end thereof, said side portions having at least one aperture therein;
(d) each of said framework members being positioned in telescoping relation with one of said tubular stub portions of said connecting member with said planar side portion of said framework member adjacent said planar side portion of said stub portion, and said aperture in said side portion of said framework member in alignment with said aperture in said side portion of said stub portion;
(e) at least one of each of said telescoping stub portions and framework members having an integral portion adjacent said aperture therein extending at least partly into the corresponding aligned aperture in the other of said telescoping members, whereby to secure said framework members to said stub portions; and
(f) each of said stub portions including a pair of reinforcing ribs extending from said planar side portion to the opposite side of said stub portion adjacent said aperture.

2. A joint assembly as defined in claim 1 wherein
(a) each of said stub portions has at least one pair of opposed generally planar side portions, and at least one aperture in each of said opposed side portions; and
(b) each of said framework members has at least one pair of opposed generally planar side portions adjacent one end thereof, and at least one aperture in each of said opposed side portions.

3. A joint assembly as defined in claim 1 wherein
(a) said connecting member is formed of a non-ferromagnetic material; and
(b) said connecting member includes means maintaining said framework members out of contact with each other when mounted on said connecting member.

4. A joint assembly as defined in claim 1 wherein said connecting member has a passage therethrough interconnecting said tubular framework members whereby a ventilation system is provided for the framework structures.

5. A joint assembly as defined in claim 1 wherein
(a) said connecting member is formed of non-ferromagnetic material; and
(b) said connecting member includes means preventing direct contact between the portions of said framework members in telescoping relation with said stub portions.

6. A joint assembly for framework structures comprising:
(a) a connecting member having a plurality of tubular stub portions, each of said stub portions having at least one generally planar side portion;
(b) said planar side portions each having at least one aperture therein;
(c) a plurality of elongated tubular framework members, each of said framework members having at least one generally planar side portion adjacent one end thereof, said side portions having at least one aperture therein;
(d) each of said framework members being positioned in telescoping relation with one of said tubular stub portions of said connecting member with said planar side portion of said framework member adjacent said planar side portion of said stub portion, and said aperture in said side portion of said framework member in alignment with said aperture in said side portion of said stub portion;
(e) each of said framework members having an integral portion surrounding said apertures therein extending into said corresponding aligned aperture in said stub portion; and
(f) each of said stub portions including a pair of reinforcing ribs extending from said planar side portion to the opposite side of said stub portion adjacent said aperture.

References Cited
UNITED STATES PATENTS

| | | |
|---|---|---|
| 653,399 | 7/1900 | Rapp. |
| 2,844,215 | 7/1958 | Blank et al. |
| 2,861,659 | 11/1958 | Hagerty et al. |
| 2,926,941 | 3/1960 | Thompson. |
| 3,008,741 | 11/1961 | MacCormack. |
| 3,068,029 | 12/1962 | Schwartz. |
| 3,089,716 | 5/1963 | Berkowitz. |
| 3,255,721 | 6/1966 | Peterschmidt. |

FOREIGN PATENTS

| | | |
|---|---|---|
| 1,286,872 | 1/1962 | France. |

CARL W. TOMLIN, *Primary Examiner.*

WAYNE L. SHEDD, *Assistant Examiner.*